(12) United States Patent
Heusinger (10) Patent No.: US 11,034,375 B2
(45) Date of Patent: Jun. 15, 2021

(54) INDUSTRIAL TRUCK COMPRISING A DRIVER'S CAB AND A STEERING UNIT

(71) Applicant: Jungheinrich Aktiengesellschaft, Hamburg (DE)

(72) Inventor: Sebastian Heusinger, Hamburg (DE)

(73) Assignee: Jungheinrich Aktiengesellschaft, Hamburg (DE)

(*) Notice: Subject to any disclaimer, the term of this patent is extended or adjusted under 35 U.S.C. 154(b) by 25 days.

(21) Appl. No.: 16/296,867

(22) Filed: Mar. 8, 2019

(65) Prior Publication Data
US 2019/0276066 A1    Sep. 12, 2019

(30) Foreign Application Priority Data

Mar. 8, 2018 (DE) ...................... 10 2018 105 409.2

(51) Int. Cl.
*B66F 9/075* (2006.01)
*B62D 1/18* (2006.01)
*B62D 1/04* (2006.01)

(52) U.S. Cl.
CPC ................. *B62D 1/18* (2013.01); *B62D 1/04* (2013.01); *B66F 9/0759* (2013.01); *B66F 9/07568* (2013.01)

(58) Field of Classification Search
CPC ......... B62D 1/18; B62D 1/183; B66F 9/0759; B66F 9/07568

(Continued)

(56) References Cited

U.S. PATENT DOCUMENTS 3,533,302 A * 10/1970 Hansen ................... B62D 1/184
74/493
3,678,778 A * 7/1972 Groves ................... B62D 1/184
74/493

(Continued)

FOREIGN PATENT DOCUMENTS

DE         10013076 A1 *  9/2001 ............. B62D 1/187
DE   102006022113 A1    11/2007

(Continued)

OTHER PUBLICATIONS

Machine language translation of DE 10013076 A1 obtained from www.espacenet.com on Jan. 20, 2021.*

(Continued)

*Primary Examiner* — Ruth Ilan
(74) *Attorney, Agent, or Firm* — Barclay Damon LLP (57) ABSTRACT

An industrial truck comprising a driver's cab including a steering unit, a steering bracket having a base plate and a profile structure for receiving the steering unit, a fastener disposed in combination with the driver's cab and configured to secure the steering bracket to the driver's cab, and an adapter unit mounting the steering bracket to the driver's cab while allowing variations in the vertical position of the steering unit. More specifically, the steering unit defines a longitudinal cavity for receiving the outwardly projecting profile structure of the steering bracket. Additionally, the adapter plate defines at least two apertures, at least one of the apertures mounting to one of the at least two height differentiating positions of the fastener. As such, the vertical height of the steering unit may be varied relative to a fixed vertical height or position within the driver's cab.

12 Claims, 7 Drawing Sheets

(58) Field of Classification Search
USPC .................................. 280/779; 180/326, 334
See application file for complete search history.

(56)     References Cited

U.S. PATENT DOCUMENTS

| | | | | |
|---|---|---|---|---|
| 4,424,721 | A * | 1/1984 | Deacon | B62D 1/184 |
| | | | | 403/108 |
| 9,764,642 | B2 * | 9/2017 | Anderton | B60K 37/06 |
| 2007/0262221 | A1 * | 11/2007 | Schroder | B66F 9/07545 |
| | | | | 248/278.1 |
| 2009/0114056 | A1 * | 5/2009 | Nashef | B62D 1/184 |
| | | | | 74/493 |
| 2012/0146316 | A1 * | 6/2012 | Roach | B62D 1/184 |
| | | | | 280/779 |
| 2015/0096405 | A1 | 4/2015 | Hoock | |

FOREIGN PATENT DOCUMENTS

| | | | |
|---|---|---|---|
| DE | 102009057028 A1 | 6/2011 | |
| DE | 102011016841 A1 | 10/2012 | |
| GB | 2381853 A * | 5/2003 | ............ B66F 9/0759 |

OTHER PUBLICATIONS

DE 10 2018 105 409.2; filed Mar. 8, 2018; German Search Report dated Mar. 8, 2019; 10 pages.
DE 10 2018 105 409.2; filed Mar. 8, 2018; English Translation of German Search Report dated Mar. 8, 2019; 2 pages.

* cited by examiner

INDUSTRIAL TRUCK COMPRISING A DRIVER'S CAB AND A STEERING UNIT

CROSS REFERENCE TO RELATED INVENTION

This application is based upon, and claims priority to, under relevant sections of 35 U.S.C. § 119, German Patent Application No. 10 2018 105 409.2, filed Mar. 8, 2018, the entire contents of which are hereby incorporated by reference.

TECHNICAL FIELD

The present disclosure relates to an industrial truck, and more particularly, to an industrial truck having a new and useful steering unit having a steering wheel and bracket/profile/adaptor which facilitates mounting and/or relocation of the steering unit for ergonomic operation.

BACKGROUND

It is known from the prior art to combine a steering wheel and other operating elements in a steering unit that can be installed in the vehicle and driver's cab as a single module. It is also known from the prior art to adjust the height of the steering unit according to the desired operating scenario so as to ensure ergonomic operation of the industrial truck. A disadvantage of height-adjustable steering units is, however, that they include a plurality of additional components and integrated modules, making installation in the industrial truck complex and laborious.

BRIEF SUMMARY OF THE INVENTION

The industrial truck according to the disclosure includes a steering unit for installation within driver's cab, which steering unit comprises a steering wheel and other related elements. The steering unit forms an integrated assembly or single module, which is installed in the driver's cab. A steering bracket is provided comprising a base plate having a profile structure that projects from the base plate. The profile structure may, for example, be configured to include a square or circular-shaped cross-sectional configuration and/or a bar or rod-shaped profile projection. More specifically, an adapter unit is configured to be mounted to a fastener, fastening device or fastening means. A steering bracket is configured for mounting to the adapter unit and receives the steering unit. More specifically, the steering unit interfaces with, or slideably engages, the profile structure, i.e., the square-shaped structure projecting from the base plate. Furthermore, the adapter unit mounts to the fastener at one of at least two height differentiating positions so as to vary the mounting position or height of the steering unit. More specifically, the adapter unit includes at least two mounting apertures which are configured to mount to one of the at least two height differentiating positions of the fastener.

According to the disclosure, the fastener or fastening means is installed in the driver's cab regardless of the desired height of the steering unit. Rather, an adapter unit is mounted in combination with the fastener at different heights by the adapter plate. The adapter unit is disposed in combination with the steering bracket which, in turn, supports or receives the steering unit.

A particular advantage of this construction, i.e., with its height-adjustable steering unit, steering bracket, fastening means and adapter unit, identical modules can be used in the construction and design of a variety of industrial trucks without having to make special adaptations for different heights of various element e.g., the steering unit.

By employing an adapter unit comprising an adapter plate that can be mounted at least two different heights on the fastener or fastening means, a stepped-height adjustment system may be employed. In one embodiment of the stepped-height adjustment system, the adapter plate has at least one set of apertures at different heights which facilitates installation at height differentiating positions of fastener. Each set of apertures is assigned to a fastening means, for example, a weld stud mounted in the driver's cab. A plurality of apertures makes it possible to mount the adapter plate at different heights.

In one embodiment, the adapter plate has a longitudinal recess for each set of apertures. Each set of apertures may be arranged at the base of each longitudinal recess, such that the height of the adapter plate is always adjusted within a longitudinal recess. The apertures for receiving the fastening means are, therefore, arranged in a recess or longitudinal recess. In this way, a nut or screw placed onto the fastening means is, essentially, "countersunk" by the adapter plate, i.e., the nut does not protrude therefrom. As such, the steering bracket can be mounted in planar alignment with the adapter plate.

One, two or more longitudinal recesses may be arranged, one above the other, in the adapter plate. By virtue of one or more longitudinal recesses, a corresponding number of fastening means can be used to mount the adapter plate, and, thus, ultimately the steering unit. In principle, one longitudinal recess may be sufficient. Two or three longitudinal recesses arranged one above the other may be arranged one above the other in a vertical line, or arranged one above the other so as to be laterally offset relative to one another. Preferably, the adapter plate has a plurality of apertures for connection to the steering bracket, as a result of which simple mounting of the steering bracket on the adapter plate is possible.

The industrial truck according to the disclosure comprises a driver's cab in which a steering unit comprising a steering wheel and other operating elements is provided. The steering unit is a self-contained module that can be mounted in one piece on a steering bracket. The steering bracket, in turns, comprises a base plate and a profile that projects from the base plate. The profile may have a square, cylindrical or rod-shaped profile, for example. The steering bracket, with its protruding profile structure, receives the steering unit in a longitudinal cavity. That is, in order to mount the steering unit, it is arranged on the projecting profile of the steering bracket.

According to the disclosure, the fasteners which is provided and intended for mounting the adapter unit is also provided in the driver's cab. The adapter unit is mounted on the fastening means at a defined height in the driver's cab. According to the disclosure, the adapter unit is designed as a ball rail which is provided with apertures, on which the steering bracket can be mounted by way of at least one rolling or sliding that can move along the ball rail. The use of an adapter unit comprising a ball rail along which a movable element is slidably fastened allows for step-less height adjustment of the steering bracket and thus of the steering unit as well.

An advantage of this steplessly height-adjustable steering unit is that a large number of components and modules have an identical design to the stepped height adjustment system. Only the adapter plate to be mounted on the fastening means is replaced by a ball rail and the elements that can move thereon. All other elements are identical. The ball rail is designed as an elongate profile which is, for example, equipped with lateral countersunk ball tracks, the movable elements being arranged together such that the balls thereof run along the ball tracks. In principle, other movable elements not including balls or sliding carriages may also be employed.

The above-mentioned configuration relates to a stepless height adjustment system using a ball rail comprising elements that can move thereon. Both the stepped height adjustment system and the step-less height adjustment system have a modular design which allows simple installation using a small number of component parts.

In another embodiment of the step-less height adjustment system, the at least one movable element is designed as a carriage that is held on, and can slide along, the ball rail. The carriage allows for height adjustment of the movable element on the mounted ball rail which is less complex and requires little effort. In addition, a detent may be provided at each end of the ball rail, which detents prevent the carriage from sliding off the ball rail.

In yet another embodiment, the steering bracket is connected to the carriage and can slide together therewith along the ball rail. The connection may be configured such that the same steering bracket may be used in both the stepped and step-less height adjustment systems.

The step-less height adjustment system functions using a gas damper, which is attached by one end in the driver's cab and with the other end engages on the steering bracket or a carriage. The gas damper may be configured as a displacement/motion damper that can be blocked in a step-less manner and that supports the weight of the steering bracket/steering unit when released without yielding. The gas damper may be adjusted by means of a raising and lowering motion, for example of the steering unit, and is lengthened or shortened accordingly. When securing the gas damper to the carriage, an accommodating plate that facilitates installation may be placed therebetween.

With respect to the stepped and step-less height adjustment systems, there are a variety of different embodiments. According to one of the embodiments common to both variants, the steering unit is arranged on the profile of the steering bracket so as to enable sliding motion between various positions. Depending on the orientation of the profile structure, this can alter both the height and the depth of the steering unit adjustment. The depth is hereby understood to mean the distance of the steering unit from a cab wall or cab pillar. A locking apparatus may, for example, be provided for the slidably positioning the steering unit on the profile structure, which locking apparatus: (i) is released by a user, (ii) allows and locks free sliding of the steering unit, and (iii) locks the position of the steering unit on the profile structure of the steering bracket. An actuation element may be provided on the steering unit for this adjustment procedure, by means of which actuation element a connection between the steering unit and the steering bracket can be released and tightened in order to lock the steering unit in position on the profile.

In one embodiment, the steering unit comprises a display wherein information is displayed relating to the operating state and condition of the industrial truck.

BRIEF DESCRIPTION OF THE DRAWINGS

The various embodiments of a step-less height adjustment system and stepped height adjustment system are described in greater detail below. According to the following.

DETAILED DESCRIPTION OF THE INVENTION

Figure 1:
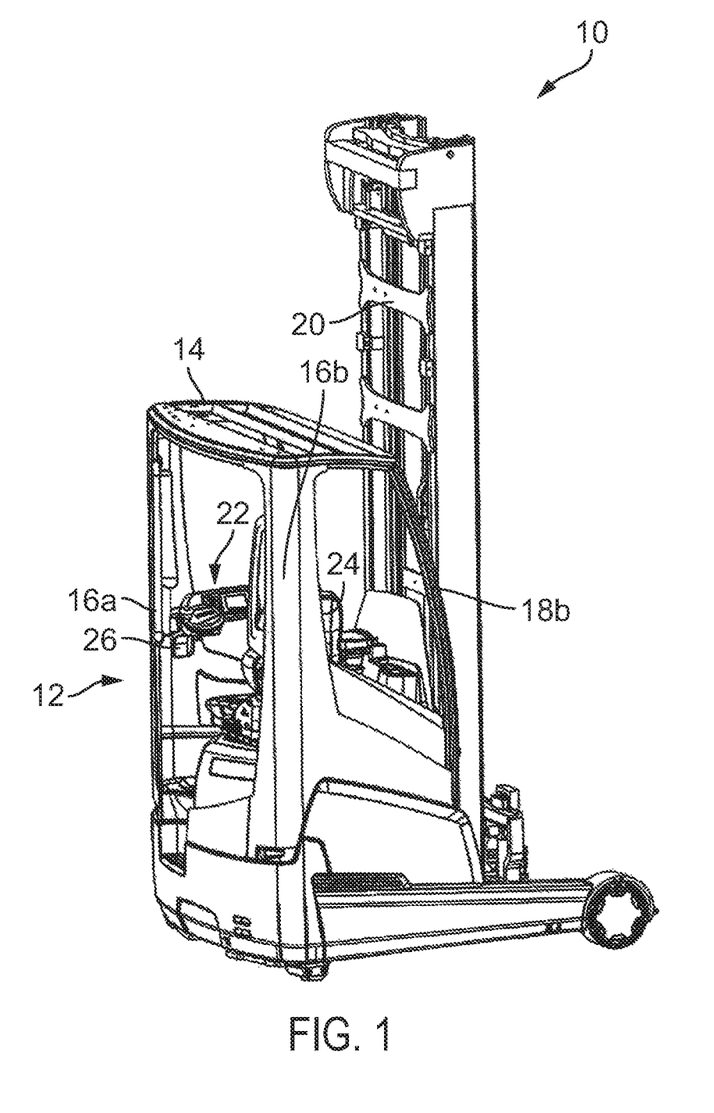
FIG. 1 depicts an industrial truck according to an exemplary embodiment of the disclosure comprising a driver's cab and a thrust mast.

FIG. 1 shows an industrial truck 10 comprising a driver's cab 12. The driver's cab 12 comprises an overhead guard 14 which is supported by four pillars. Of the four pillars, the pillars 16a, 16b facing away from the thrust mast 20 are designed as A-pillars, whereas the pillars facing towards the thrust mast 20 are designed as B-pillars 18a, 18b. In the exemplary embodiment shown, the driver's cab 12 is designed such that there is an entrance into the driver's cab between the A-pillars 16a, 16b. A steering unit 22 is arranged on the A-pillar 16a in the driver's cab 12 and extends in the lateral region between the A-pillar 16a and the corresponding B-pillar, which from the perspective shown is hidden from view by the A-pillar 16b. The driver's seat 24 is arranged opposite the steering unit 22, with its seating surface facing the steering unit 22. A cable channel 26 can also be seen in FIG. 1, which cable channel guides lines and cables underneath the steering unit 22 into the vehicle interior and thus to the vehicle's steering system.

Industrial trucks comprising a driver's cab are generally modified so as to be ergonomic. In this respect, it should be noted that in some cases significant differences may arise with regard to body size. These differences not only apply to the individual user, but also to the markets, since the industrial trucks are manufactured uniformly worldwide as far as possible. For example, a vehicle for the Scandinavian or North American market may have different requirements in terms of the ergonomic configuration of the steering unit than a vehicle intended for the Asian market.

Figure 2A:
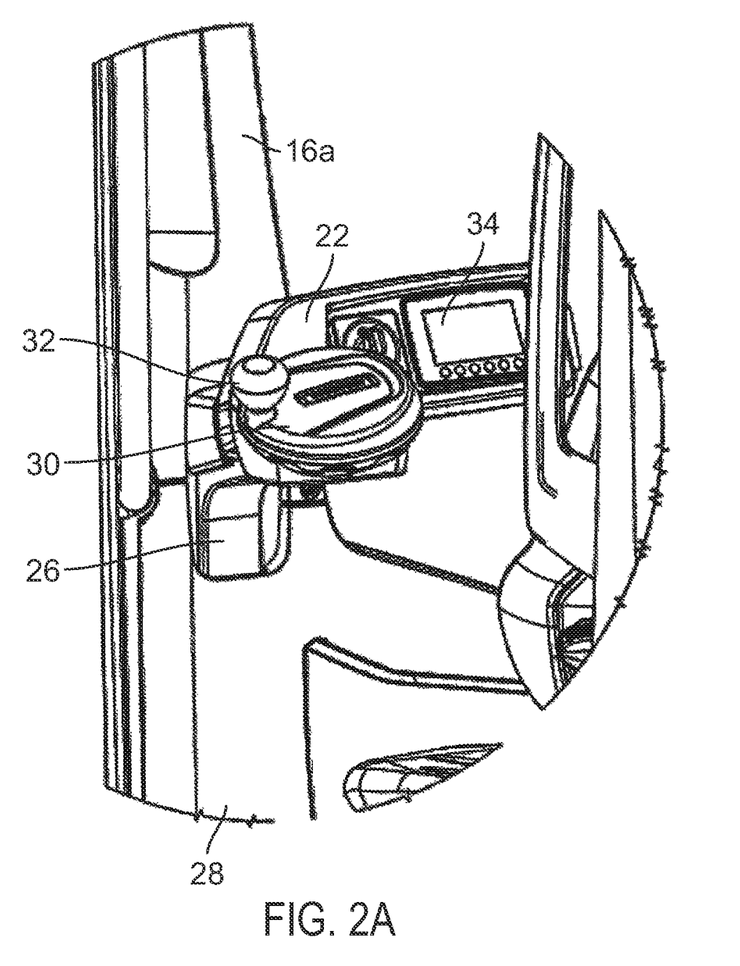
FIGS. 2a and 2b show detailed views of the industrial truck depicted in FIG. 1, comprising a steering unit in a raised and in a lowed position.
Figure 2B:
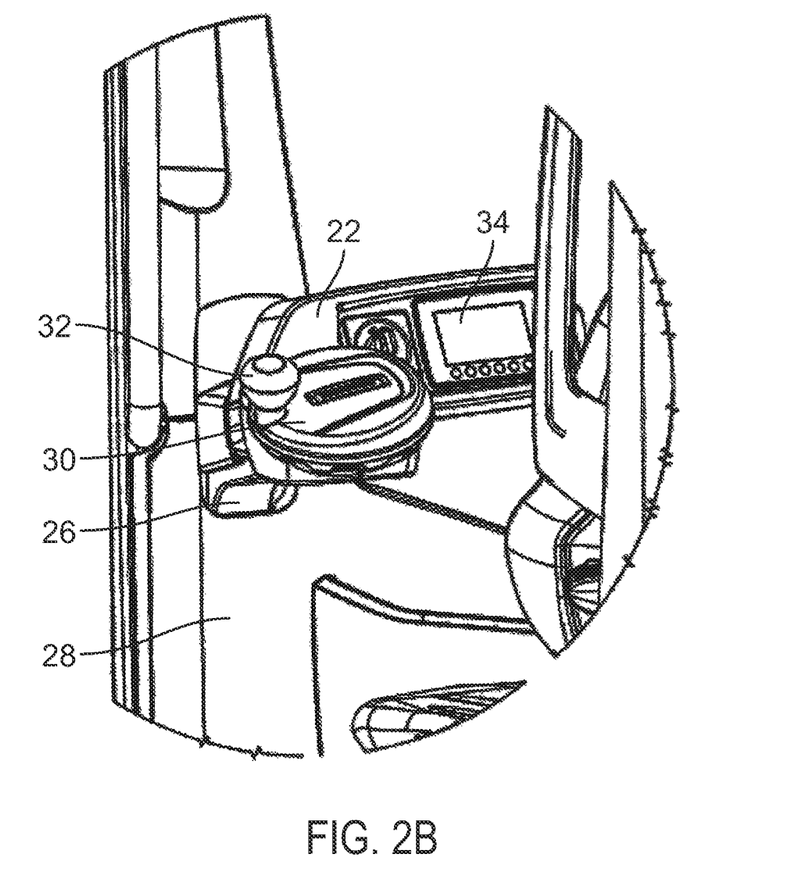

FIGS. 2a and 2b show the steering unit 22 mounted at various heights. A cover 28 that has an opening for the cable channel 26 is mounted on the side of the A-pillar 16a facing towards the driver's cab. FIG. 2a shows the raised position, in which a good part of the cable channel 26 is visible in the opening. FIG. 2b shows the lowered position of the steering unit 22, in which the cable channel 26 is largely concealed by the cover 28. As can be seen in FIG. 2a, and 2b, the steering unit 22 comprises a steering wheel 30 having a steering knob 32. A display 34 can also be seen in FIGS. 2a and 2b, wherein the operating/driving states and conditions of the industrial truck can be displayed.

Figure 3:
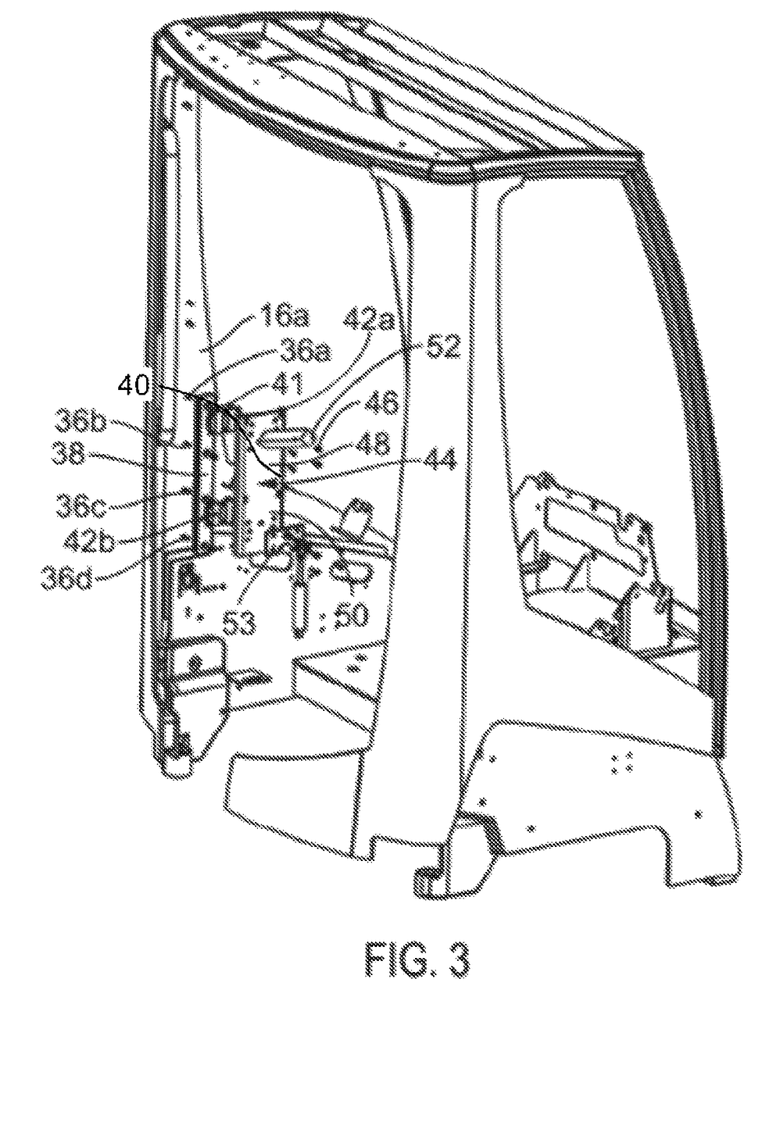
FIG. 3 shows the driver's cab of the industrial truck as shown in FIG. 1 comprising a ball rail and a carriage.

For greater clarity, FIG. 3 shows the design of a step-less height adjustment system wherein many of the internal components have been removed to reveal the relevant internal details. The A-pillar 16a comprises four protruding studs 36a, 36b, 36c, 36d. The protruding studs 36a, 36b, 36c, 36d are, for example, designed as weld studs which are welded to the A-pillar 16a. The ball rail 38 is mounted on the studs 36a, 36b, 36c, 36d and fastened using nuts 40. The ball rail 38 is thus screwed to the A-pillar 16. For this purpose, the ball rail 38 comprises four holes or apertures, through which the studs 36a, 36b, 36c, 36d protrude. Two carriages 42a, 42b are arranged on the ball rail 38 and travel using inwardly-oriented wheels or balls along a track 41 provided on a side of the ball rail 38. In this way, the carriages 42 are secured on the ball rail 38 and can only move upward or downward on the ball rail 38.

A steering bracket 44 is attached to the carriages 42a, 42b. The steering bracket 44 is mounted on the carriages 42a, 42b by its base plate 48 using two sets of four screws 46. The steering bracket 44 consists of a base plate 50, on which a projecting square profile 52 is arranged.

Figure 4:
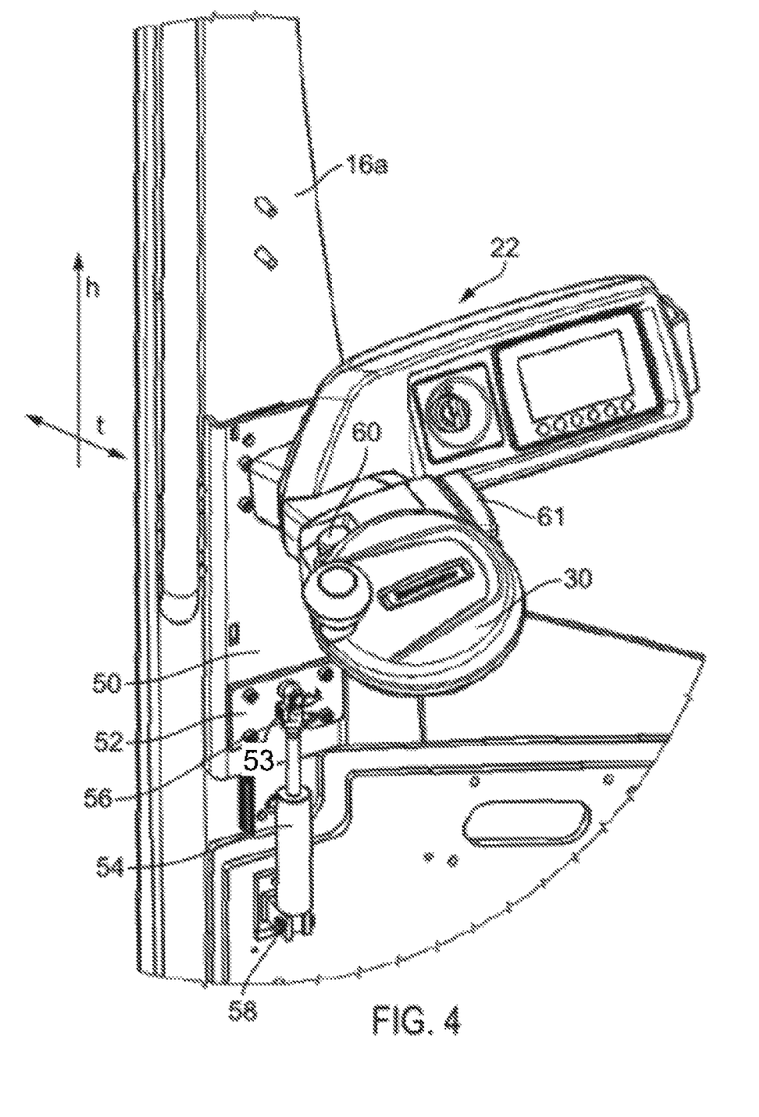
FIG. 4 depicts a detailed view of the installed steering bracket and steering unit.

FIG. 4 shows the preassembled arrangement on the A-pillar 16a. In this figure, it is possible to discern the ball rail 38 on which the base plate 50 of the steering bracket 44 is mounted over the carriages. The base plate 50 of the steering bracket 44 comprises a fastening plate 53 on which a gas damper 54 engages. The gas damper 54 comprises a head 56 that is equipped with an adjustment mechanism (not shown) for releasing the locking position of the gas damper 54. The gas damper 54 is mounted by the opposite end in the driver's cab by means of a mounting element 58.

The steering unit 22 is placed onto the projecting square profile 52 of the steering bracket. The steering unit 22 is arranged so as to be able to slide in the longitudinal direction of the square profile 52 and can be adjusted in height h and depth t. An actuation button 60 is provided behind the steering wheel 30 for adjustment of the steering unit 22. The button can be pressed in order to move the steering unit in height h over the ball rail 38. A clamping element 61 is provided for moving the steering unit along the square profile 52 (obliquely toward the driver), by means of which clamping element the steering unit can be locked to or released from the square profile 52.

Figure 5A:
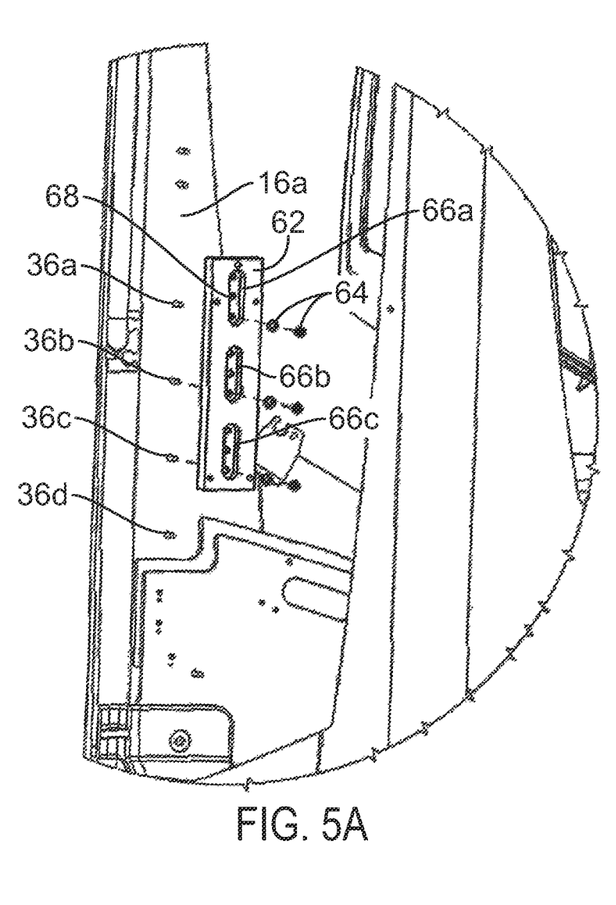
FIGS. 5a-5c are detailed views of an adapter unit installed at various heights.
Figure 5B:
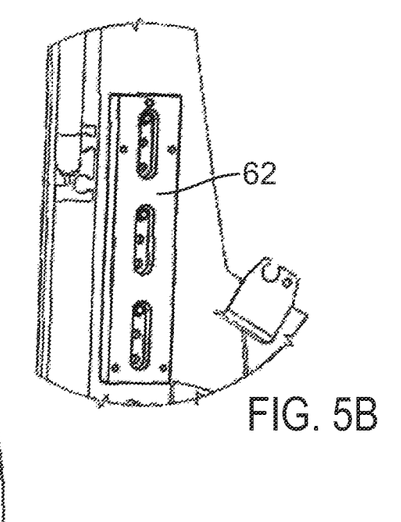
Figure 5C:
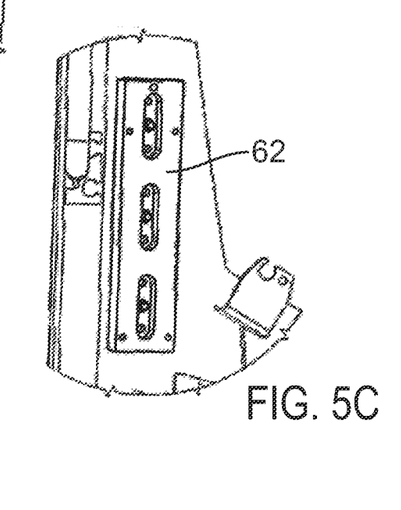

FIGS. 5a to 5c and 6 show the design of the stepped height adjustment system in greater detail. FIG. 5a again shows the A-pillar 16a comprising the protruding fastening means 36a, 36b, 36c, 36d. FIG. 5a shows how, in the case of the stepped height adjustment system, the adapter plate 62 is mounted on the protruding studs 36a, 36b and 36c using nuts and washers 64. The adapter plate 62 comprises three longitudinal recesses 66a, 66b, 66c. Each of the longitudinal recesses comprises three holes or apertures 68 at their base. Using solely the protruding fastening studs 36a to 36c, the three holes or apertures 68 in the longitudinal recesses 66a, 66b, 66c make it possible to mount the adapter plate 62 at three different heights. In this way, as shown in the sequence in FIGS. 5a, 5b and 5c, the adapter plate 62 can be mounted in its highest position (FIG. 5a), lowest position (FIG. 5b) or central position (FIG. 5c). Of course, there are three other height levels if the fastening means 36b, 36c, 36d are used.

Figure 6:
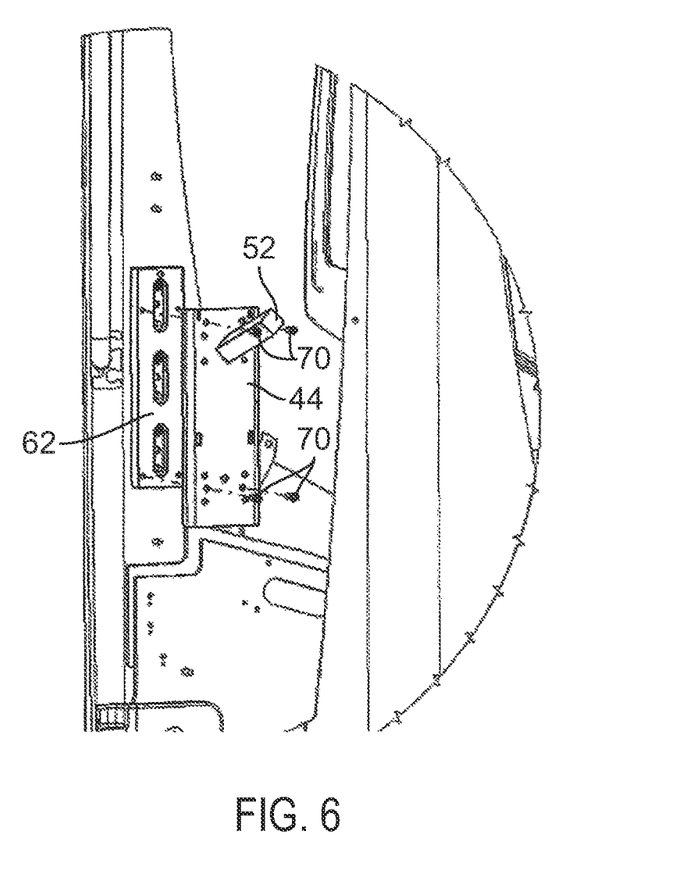
FIG. 6 illustrates the installation of the steering bracket.

FIG. 6 shows how the steering bracket 44 is mounted on the adapter plate 62. The steering bracket 44 is screwed into the corresponding holes or apertures 68 in the adapter plate 62 by means of four screws 70. The longitudinal recesses 66a, 66b, 66c are designed such that a nut on the fastening studs 36a, 36b, 36c does not protrude out of the adapter plate 62. The steering bracket 44 comprises a projecting profile 52, which projects at an angle with respect to the base plate. In order to aid understanding of the disclosure, it is important to note that the steering bracket 44 is identical to the steering bracket 44 from FIG. 3.

The industrial truck according to the disclosure provides the possibility of ergonomic adjustment of the steering wheel height, as a result of which adaptations to different markets in various regions of the world and for different percentiles (5% women/95% men) can be made. The modular design produces a cost-effective and convenient solution by transferring the main components, i.e. steering unit, steering bracket and fastening means, to the cab pillar. It is particularly advantageous that the height and length can also be adjusted at the same time by virtue of the combination of the steering bracket and steering unit.

LIST OF REFERENCE NUMBERS

10 Industrial truck
12 Driver's cab
14 Overhead guard
16a,b A-pillars
18b B-pillars
20 Thrust mast
22 Steering unit
24 Driver's seat
26 Cable channel
28 Cover
30 Steering wheel
32 Steering knob
34 Display
36a-d Studs
38 Ball rail
40 Nuts
41 Track
42a,b Carriages
44 Steering bracket
46 Screws
48 Base plate
50 Base plate
52 Square profile
53 Fastening plate
54 Gas damper
56 Head
58 Mounting element
60 Actuation button
61 Clamping element
62 Adapter plate
64 Washer
66a-c Longitudinal recesses
68 Holes
70 Screws

The invention claimed is:

1. An industrial truck comprising:
    a driver's cab;
    a steering bracket including a base plate and a profile support projecting from the base plate, the profile support configured to receive a steering unit;
    a fastener disposed in combination with the driver's cab and configured to secure the steering bracket to the driver's cab, and
    an adapter unit including an adapter plate defining an aperture configured to engage the fastener, wherein one of the fastener and the adapter plate defines at least two height differentiated positions, and
    wherein the aperture of the adapter plate engages the fastener at one of the at least two height differentiated positions so as to vary the vertical height of the steering unit.

2. The industrial truck according to claim 1, wherein the adapter plate includes a longitudinal recess circumscribing each set of apertures.

3. The industrial truck according to claim 2, wherein each set of apertures of the adapter plate includes a longitudinal recess circumscribing a respective set of apertures, and wherein at least two longitudinal recesses are linearly-arranged, one above the other, in the adapter plate.

4. The industrial truck according to claim 3, wherein the adapter plate comprises a plurality apertures for mounting to the steering bracket.

5. An industrial truck comprising:
   a driver's cab;
   a steering bracket including a base plate and a profile structure that projects from the base plate, the profile structure configured to receive a steering unit;
   a fastening means configured to secure the steering bracket to a driver's cab, and
   an adapter unit, including a ball rail defining an aperture for engaging the fastening means to secure the steering bracket
wherein one of the fastening means and ball rail defines at least two height differentiating positions, and
wherein the aperture of the ball rail engages the fastening means at one of the at least two height different positions so as to vary the vertical height of the steering unit.

6. The industrial truck according to claim 5, wherein the adapter unit includes a carriage that is mounted to, and slides along, the ball rail.

7. The industrial truck according to claim 6, wherein the steering bracket is connected to the carriage and slides together with the ball rail.

8. The industrial truck according to claim 7, further comprising a gas damper articulately mounting to one end of the steering bracket for damping vertical oscillations of the steering unit while in operation.

9. The industrial truck according to claim 8, wherein the steering unit slideably mounts to the profile structure of the steering bracket so as to enable transverse positioning of the steering unit relative to the driver's cab.

10. The industrial truck according to claim 9, further comprising a steering unit having a clamping unit configured to releasably connect the steering unit to the steering bracket so that the steering unit may be released and tightened in order to lock the steering unit in a desired transverse position along the profile structure.

11. The industrial truck according to claim 10, further comprising an actuation button for releasing and locking the gas damper to adjust the vertical height of the steering unit.

12. An industrial truck comprising:
   a driver's cab;
   a steering bracket including a base plate and a profile structure projecting transversely toward a seat within a driver's cab of the industrial truck, the profile structure configured to receive a steering unit;
   a fastener disposed in combination with the driver's cab and configured to secure the steering bracket to the driver's cab, and
   an adapter unit, including a ball rail defining an aperture for engaging the fastener and for securing the steering bracket to the driver's cab, the adapter unit including a carriage mounted to, and sliding along, the ball rail; and
wherein one of the fastener and ball rail defines at least two height differentiating position, and wherein the aperture of the ball rail engages the fastener at one of the at least two height differentiating positions so as to vary the vertical height of the steering unit
   a steering unit having a clamping assembly configured to releasably connect the steering unit to the steering bracket so that the steering unit may be released and tightened in order to lock the steering unit in a desired transverse position along the profile structure;
   a gas damper articulately mounting to one end of the steering bracket for damping vertical oscillation of the steering unit; and
   an actuation button for releasing and locking the gas damper to adjust the vertical height of the steering unit;
   wherein the steering bracket is connected to the carriage and slides together with the ball rail,
   wherein the steering unit slideably mounts to the profile structure of the steering bracket so as to enable transverse positioning of the steering unit relative to the driver's cab.

\* \* \* \* \*

UNITED STATES PATENT AND TRADEMARK OFFICE
CERTIFICATE OF CORRECTION

| | |
|---|---|
| PATENT NO. | : 11,034,375 B2 |
| APPLICATION NO. | : 16/296867 |
| DATED | : June 15, 2021 |
| INVENTOR(S) | : Sebastian Heusinger |

It is certified that error appears in the above-identified patent and that said Letters Patent is hereby corrected as shown below:

In the Claims

Claim 1:
Column 6
Line 56 change "differentiated" to --differentiating--

Claim 4:
Column 7
Line 2 between "plurality" and "apertures" insert --of--

Claim 5:
Column 7
Line 17 change "different" to --differentiating--

Claim 12:
Column 8
Line 18 change "position" to --positions--

Signed and Sealed this
Fourteenth Day of December, 2021

Drew Hirshfeld
*Performing the Functions and Duties of the
Under Secretary of Commerce for Intellectual Property and
Director of the United States Patent and Trademark Office*